(12) United States Patent
Yaman (10) Patent No.: US 10,020,631 B2
(45) Date of Patent: Jul. 10, 2018

(54) 3-DIMENSIONAL INSCRIPTED WDM COUPLER FOR OPTICAL AMPLIFIERS AND METHODS FOR USING 3-DIMENSIONAL INSCRIPTED WDM COUPLERS IN NETWORKS

(71) Applicant: NEC Laboratories America, Inc., Princeton, NJ (US)

(72) Inventor: Fatih Yaman, Princeton, NJ (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 15/462,102

(22) Filed: Mar. 17, 2017

(65) Prior Publication Data

US 2017/0279242 A1    Sep. 28, 2017

Related U.S. Application Data

(60) Provisional application No. 62/311,625, filed on Mar. 22, 2016.

(51) Int. Cl.
*H01S 3/094* (2006.01)
*H01S 3/067* (2006.01)
*H01S 3/16* (2006.01)
*G02B 6/12* (2006.01)
*H01S 3/0941* (2006.01)

(52) U.S. Cl.
CPC .... *H01S 3/094049* (2013.01); *G02B 6/12002* (2013.01); *G02B 6/12007* (2013.01); *H01S 3/06737* (2013.01); *H01S 3/094019* (2013.01); *H01S 3/1608* (2013.01); *H01S 3/09415* (2013.01); *H01S 3/094053* (2013.01); *H01S 3/094069* (2013.01)

(58) Field of Classification Search
CPC ............ G02B 6/12002; G02B 6/12007; H01S 3/06737; H01S 3/094049
See application file for complete search history.

(56) References Cited

U.S. PATENT DOCUMENTS 5,187,760 A * 2/1993 Huber ................ G02B 6/02057
372/6
6,049,646 A * 4/2000 Boscher ............. G02B 6/02042
385/137

(Continued)

FOREIGN PATENT DOCUMENTS

JP        2016127241 A  *  7/2016

OTHER PUBLICATIONS

Abedin, K.S. et al., "Multicore Erbium Doped Fiber Amplifiers for Space Division Multiplexing Systems" Journal of Lightwave Technology (Aug. 2014) pp. 2800-2808, vol. 32, No. 16.

(Continued)

*Primary Examiner* — Eric L Bolda
(74) *Attorney, Agent, or Firm* — Joseph Kolodka (57) ABSTRACT

A 3-dimensional (3-D) inscripted wavelength division multiplexer (WDM) coupler for optical amplifiers is provided. The 3-D WDM coupler includes a substrate. The 3-D WDM coupler further includes a 3-dimensional pump waveguide direct laser inscripted into the substrate. The 3-D WDM coupler also includes a optical pump laser coupled into the 3-dimensional pump waveguide. The 3-D WDM coupler further includes a multicore fiber coupled into cores in the direct laser inscripted substrate.

19 Claims, 6 Drawing Sheets

(56) References Cited

U.S. PATENT DOCUMENTS

| | | | |
|---|---|---|---|
| 2003/0165002 A1* | 9/2003 | Sasaki | G02F 1/09 359/280 |
| 2007/0263974 A1* | 11/2007 | Khrushchev | C30B 29/20 385/141 |
| 2011/0279888 A1* | 11/2011 | Fini | G02B 6/2835 359/334 |
| 2013/0114130 A1* | 5/2013 | Stampoulidis | H01S 3/06737 359/341.32 |
| 2013/0302032 A1* | 11/2013 | Shimakawa | G02B 6/2937 398/48 |
| 2014/0036351 A1* | 2/2014 | Fini | G02B 6/2856 359/341.31 |
| 2015/0030325 A1* | 1/2015 | Chang | H04B 10/2581 398/44 |
| 2015/0050019 A1* | 2/2015 | Sengupta | H04J 14/04 398/44 |
| 2015/0086199 A1* | 3/2015 | Ryf | H01S 3/06754 398/43 |

OTHER PUBLICATIONS

Gross, S. et al., "Ultrafast-laser-inscribed 3D integrated photonics: challenges and emerging applications" Nanophotonics (Nov. 2015) pp. 332-352, vol. 4.

Jin, C. et al., "Efficient Annular Cladding Amplifier with Six, Three-Mode Cores" 2015 European Conference on Optical Communication (ECOC) (Sep. 2015) pp. 1-3.

Takeshima, K. et al., "51.1-Tbit/s MCF Transmission Over 2520 km Using Cladding-Pumped Seven-Core EDFAs" Journal of Lightwave Technology (Jan. 2016) pp. 761-767, vol. 34, No. 2.

\* cited by examiner

3-DIMENSIONAL INSCRIPTED WDM COUPLER FOR OPTICAL AMPLIFIERS AND METHODS FOR USING 3-DIMENSIONAL INSCRIPTED WDM COUPLERS IN NETWORKS

RELATED APPLICATION INFORMATION

This application claims priority to Provisional Application 62/311,625 filed on Mar. 22, 2016, incorporated herein by reference in its entirety.

BACKGROUND

Technical Field

The present invention relates to methods of using 3-dimensional inscripted wavelength division multiplexer (WDM) couplers, and more particularly methods of using 3-dimensional inscripted WDM (3-D WDM) couplers for optical amplifiers in networks.

Description of the Related Art

While current efforts focus on improving amplification of the signals being transmitted by the submarine telecommunication cables, there is little work on integrating parallelization and functionality such as wavelength division multiplexing and coupling in the same chip, and during the same manufacturing process.

What is needed is a method for using laser inscripted 3-dimensional (3-D) WDM couplers in optical amplifiers. Further, what is needed is a method for using laser inscripted 3-D WDM couplers in optical-based telecommunication networks. Further still, what is needed is a method to combine components into a single core and to optically pump light only into the cores.

SUMMARY

According to an aspect of the present invention, a 3-dimensional (3-D) inscripted wavelength division multiplexer (WDM) coupler for optical amplifiers is provided. The 3-D WDM coupler includes a substrate. The 3-D WDM coupler further includes a 3-dimensional pump waveguide direct laser inscripted into the substrate. The 3-D WDM coupler also includes an optical pump laser coupled into the 3-dimensional pump waveguide. The 3-D WDM coupler further includes a multicore fiber coupled into cores in the direct laser inscripted substrate.

According to another aspect of the present invention, a method of 3-dimensional (3-D) wavelength division multiplexer (WDM) coupling for optical amplifiers is provided. The method includes splitting an optical pump laser light into multiple light paths. The method further includes aligning the multiple light paths with a 3-dimensional pump waveguide adjacent to a signal waveguide. The method also includes coupling the multiple light paths with multiple signals in the signal waveguide, forming combined pumped signals. The method further includes delivering the combined pumped signals into a multicore fiber. The method also includes integrating the splitting, aligning, coupling and delivering to occur within a direct laser inscripted substrate.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present invention, systems and methods are provided for utilization of 3-D WDM couplers.

Figure 1:
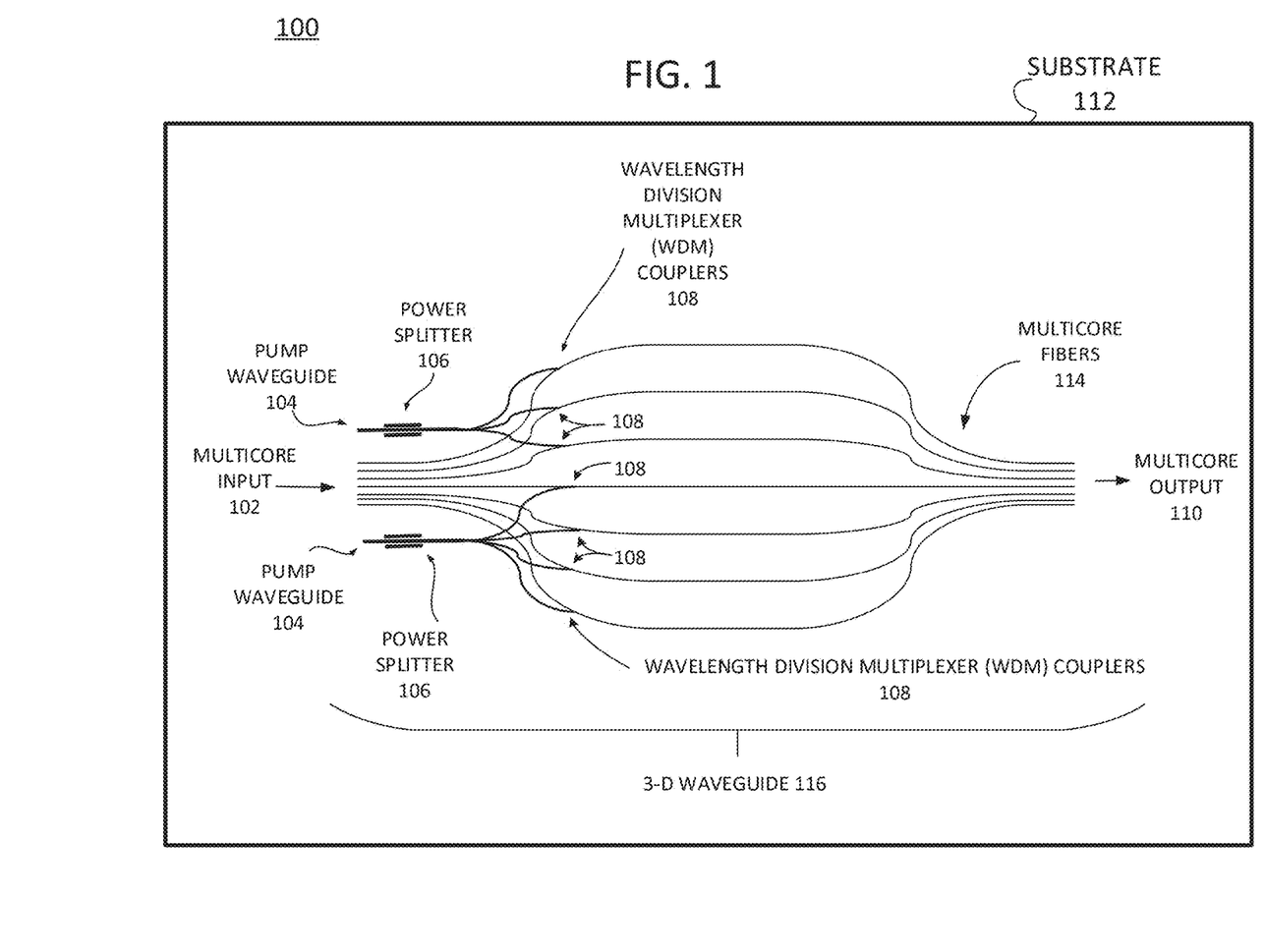
FIG. 1 is a schematic illustrating a 3-D WDM coupler, in accordance with an embodiment of the present invention.

FIG. 1 is a functional schematic of an optical amplifier 100. The optical amplifier includes 3-D WDM couplers 108, 3-D pump waveguide 104, and multicore fibers 114 integrated in an inscripted substrate 112. In the optical amplifier 100 a 3-D waveguide 116 is inscripted in a substrate 112, the multicore input 102 and multicore output 110 carry signal light into and out of the 3-D waveguide. The pump waveguide 104 and the power splitter 106 provide optical pump light. The 3-D inscription allows interfacing with a multicore fiber at both ends through multicore input 102 and multicore output 110. The 3-D waveguide 116 performs multiple functions and integrates multiple components. The 3-D waveguide 116 splits pump light into multiple paths, with a power splitter 106. The 3-D waveguide 116 aligns one pump waveguide 104 right next to one signal waveguide. The 3-D waveguide 116 provides for optical amplification of individual cores. The 3-D waveguide 116 couples pump light into the signal waveguide. The 3-D waveguide 116 delivers the combined pump and signal back into the multicore fiber at the other end of the substrate 112. Further, on both ends of the substrate 112, a multicore fiber is abutted against the substrate, and aligns the 3-D waveguide to each of the cores of the multicore fiber, aligning the multicore input 102 and multicore output 110 with the 3-D waveguide 116.

Figure 2:
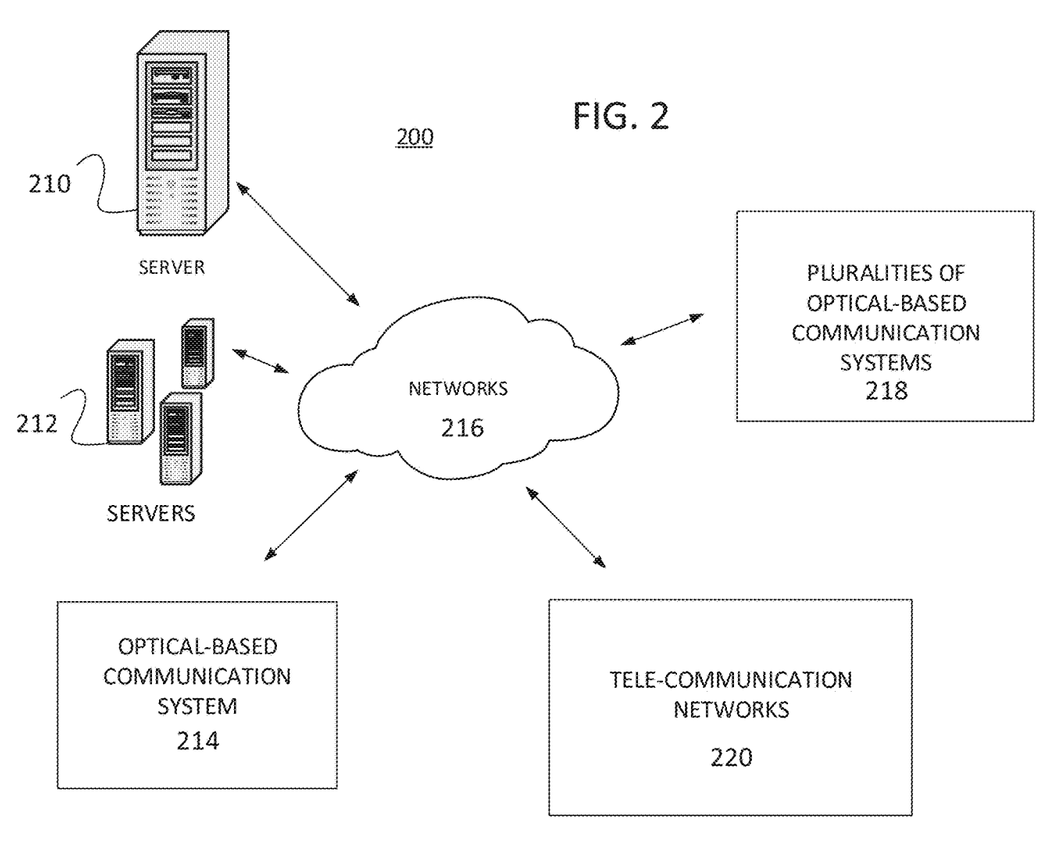
FIG. 2 is a schematic illustrating utilization of networks, in accordance with an embodiment of the present invention.

FIG. 2 is a block diagram of an exemplary environment 200 to which the present invention can be applied, in accordance with an embodiment of the present invention. The environment 200 includes at least a computer processing system 210 (labeled "server" in FIG. 2) and a plurality of servers 212, networks 216, optical-based communication system 214, pluralities of optical-based communication systems 218 and telecommunication networks 220. The computer processing system 210 can be any type of computer processing system including, but not limited to, servers, desktops, laptops, tablets, smart phones, media playback devices, and so forth, depending upon the particular implementation. For the sake of illustration, the computer processing system computer processing system is a server.

The computer processing system 210 is configured to transmit data through the utilization of laser inscripted 3-D waveguides in networks 216.

In an embodiment shown in FIG. 2, the elements thereof are interconnected by a network(s) 216. In particular, the network 216 is depicted as a wireless network. However, in other embodiments, other types of connections (e.g., wired, submarine cable systems, etc.) can also be used. Additionally, one or more elements in FIG. 2 can utilize an optical amplifier 100 as shown in FIG. 1. The optical amplifiers 100 of FIG. 1 can be used, for example, in optical-based communication system 214 and pluralities of optical-based communication systems 218. The optical-based communication system 214 and the pluralities of the optical-based communication systems 218 can utilize the optical amplifiers 100 of FIG. 1 to communicate with telecommunications networks 220. The computer processing system 210 and the servers 212 communicate through the network and can utilize the optical amplifiers 100 of FIG. 1 wherein telecommunications networks 220, optical-based communication system 214 and pluralities of optical-based communication systems 216 incorporate the optical amplifiers in their communications systems. These and other variations of the elements of environment 200 are readily determined by one of ordinary skill in the art, given the teachings of the present invention provided herein, while maintaining the spirit of the present invention.

Figure 3:
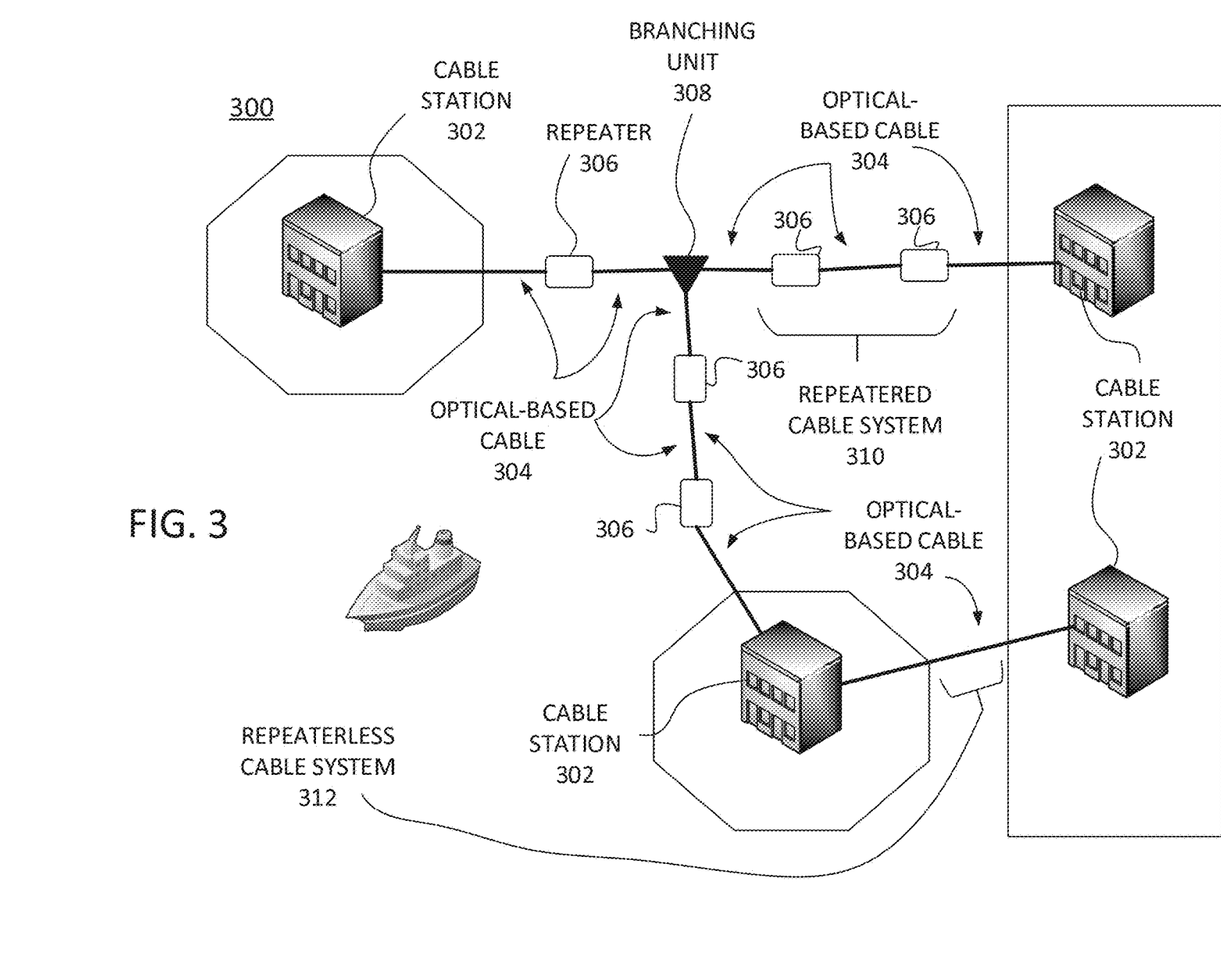
FIG. 3 is a schematic illustrating the method of integration of 3-D WDM couplers in repeaters in optical-based cable systems, in accordance with an embodiment of the present invention.

FIG. 3 is a functional schematic of optical-based communication systems 300. Optical-based communication systems 300 can utilize inscripted 3-D WDM couplers in the repeater 306 of the optical-based communication system 300. Terrestrial cable stations 302 serve to connect various networks 200 of FIG. 2 with other networks. Optical-based communication systems 300 comprise optical-based cable 304, which depending upon the overall run of optical-based cable, can contain a repeater 306. Optical-based cable systems of shorter distances can be a repeaterless cable system 312. Optical-based cable systems 300 which are longer in distance can use repeaters 306 to compensate for signal attenuation. Repeaters 306 can include the optical amplifiers 100 of FIG. 1 to amplify the signal and to compensate for signal loss. Additionally, optical-based cable systems can include a branching unit 308. A branching unit 308 connects three or more optical-based cables 304.

Figure 4:
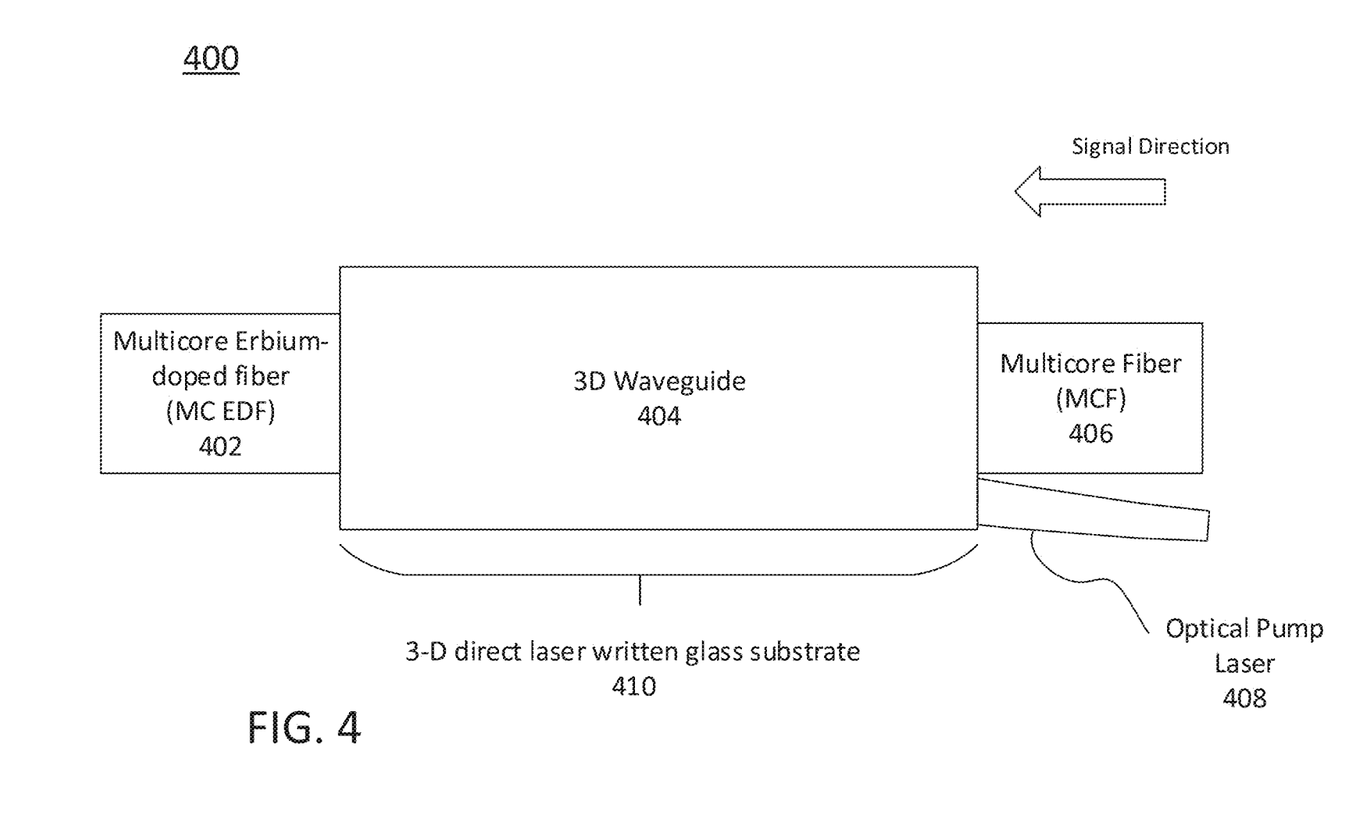
FIG. 4 is a functional block diagram illustrating the integration of 3-D WDM couplers, optical pumps, 3-D waveguide, and multicore fibers in accordance with an embodiment of the present invention.

FIG. 4 is a functional block diagram of a multicore erbium-doped fiber amplifier 400. The multicore fiber (MCF) 406 feeds into the 3-D waveguide 404 wherein the signal and the optical pump laser 408 light are coupled. Upon leaving the 3-D waveguide 404 the amplified signal enters the multicore erbium-doped fiber (MCF EDF) 402. The 3-D direct laser written glass substrate 410 is used to efficiently couple the multiple cores as well as pump the laser light into the pump waveguide, in accordance with an embodiment of the present invention. FIG. 4 shows an example of a multicore erbium-doped fiber amplifier 400 where the 3-D direct laser written glass substrate 410 is used to efficiently couple the multiple cores as well as pump laser light into the pump waveguide. The signal propagating in the multicore fiber is coupled into the cores in the glass substrate that were designed to match the core in the MCF 406. At the same time the optical pump laser 408 is coupled into the waveguide input in the substrate. A multimode diode pump is not shown in FIG. 4, and the 3-D waveguide brings the multimode pump laser from the laser diode to the substrate. However, the pump laser can also be launched into the laser waveguide inside the substrate by other methods such as direct butt coupling. The multimode pump laser can be efficiently coupled into the pump waveguide in the MC EDF 402. The pump waveguide in the multicore EDF can support a plurality of modes and can support all of the power from the multimode pump.

Figure 5:
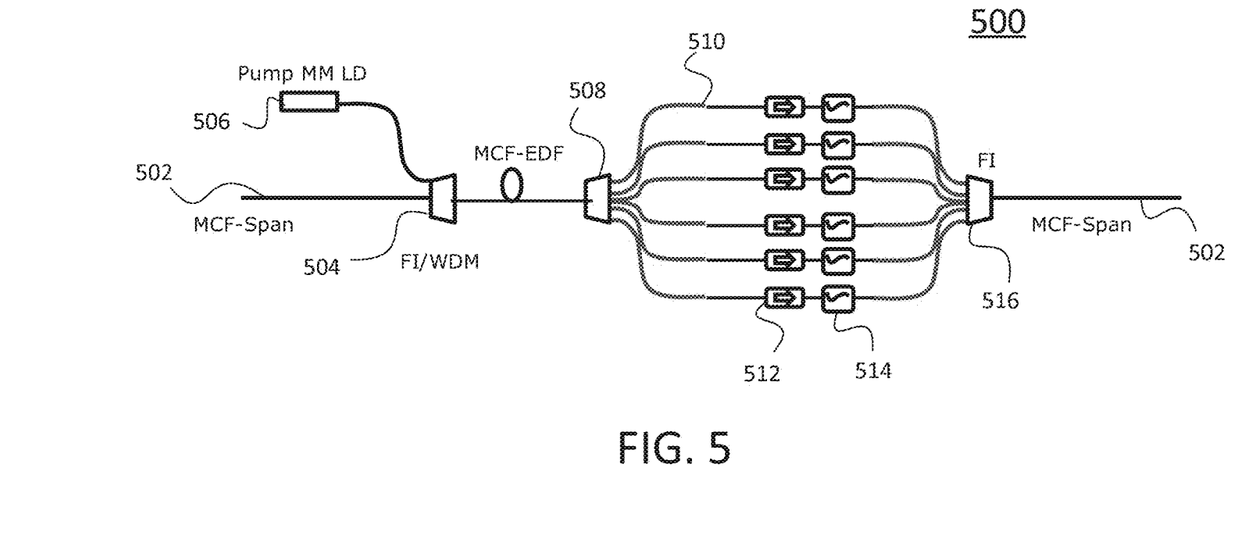
FIG. 5 is a schematic of the integration of a 3-D WDM coupler, in accordance with an embodiment of the present invention.

FIG. 5 is a schematic of the integration of a 3-D WDM coupler, depicted in accordance with an embodiment of the present invention. Multicore fiber span 502 is illustrated entering the Fan-In wavelength divisional multiplexer (FI/WDM) coupler 504. The multimode laser diode pump 506 is illustrated as connected to the FI/WDM 504 and provides pump light to FI/WDM 504. The multicore erbium-doped fiber 506 is illustrated leaving the FI/WDM and entering the Fan-Out wavelength divisional multiplexer (FO/WDM) coupler 508. The individual fibers 510 are illustrated as leaving the FO/WDM 508 and entering isolator 512. The individual fibers 510 are illustrated as leaving the isolator 512 and entering a gain flattening filter 514. The individual fibers 510 are illustrated leaving the gain flattening filter 514 and entering a Fan-In (FI) device 516. From the FI device 516 the fibers 510 exit the coupler and enter into the multicore fiber span 502.

Figure 6:
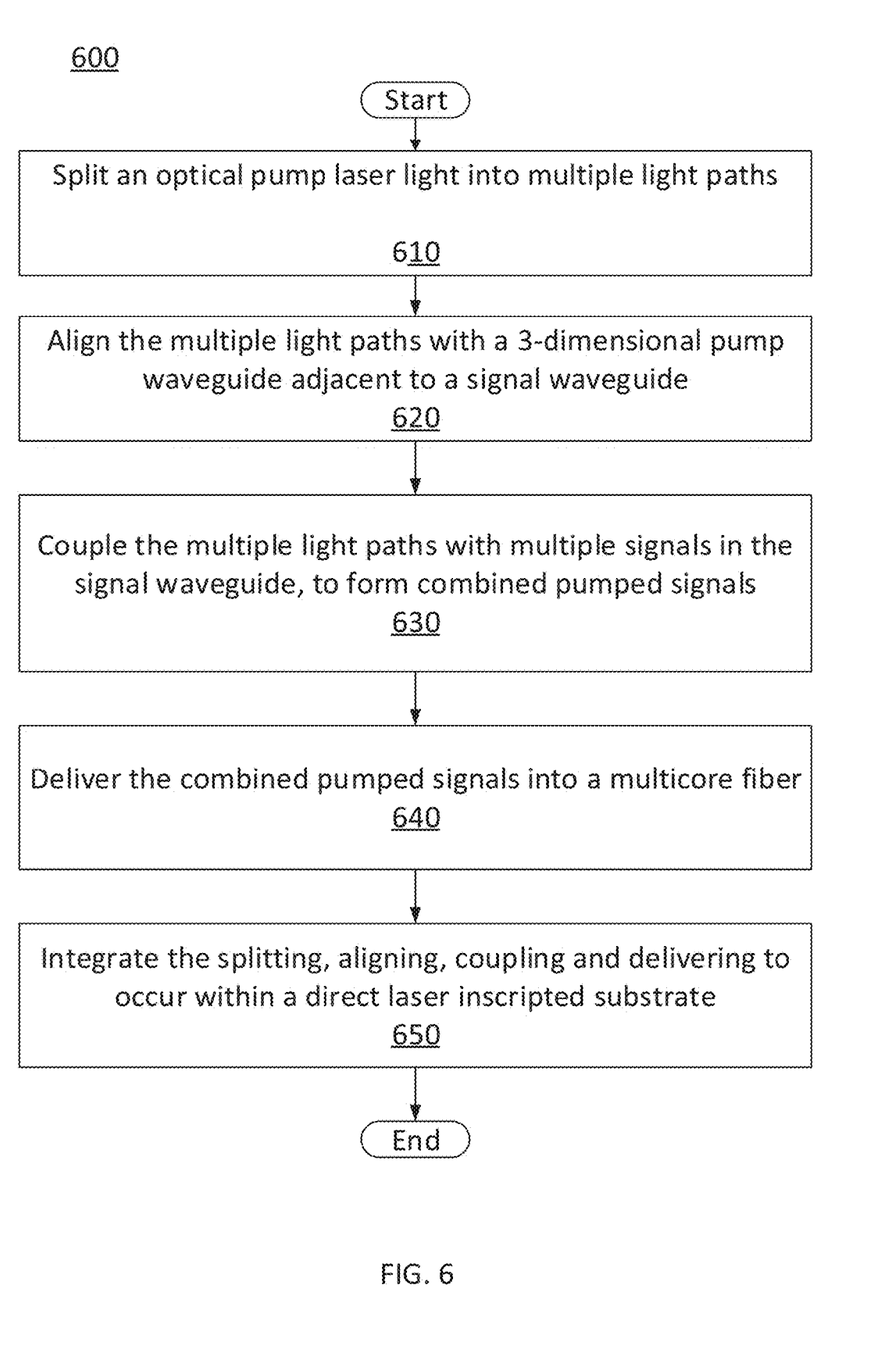
FIG. 6 is a flow diagram of an exemplary method 600 for using 3-D WDM couplers, in accordance with an embodiment of the present invention.

FIG. 6 is a flow diagram of an exemplary method 600 for using the laser inscripted 3-D WDM coupler, in accordance with an embodiment of the present invention. At step 610, the 3-D WDM coupler splits an optical pump laser light into multiple light paths. At step 620, the 3-D WDM coupler aligns the multiple light paths with a 3-dimensional pump waveguide adjacent to a signal waveguide. At step 630, the 3-D WDM coupler couples the multiple light paths with multiple signals in the signal waveguide, to form combined pumped signals. At step 640, the 3-D coupler delivers the combined pump signals into a multicore fiber. At step 650, the 3-D coupler integrates the splitting, aligning, coupling and delivering to occur within a direct laser inscripted substrate.

In an embodiment of the present invention, a 3-D laser written glass slab is utilized to convert the profile of a pump laser light. The shape of the waveguide profile can have various shapes.

In general, multimode pump laser diodes have a rectangular output profile. In an embodiment of the present invention, a glass block can take the entire pump laser in rectangular shape from one end and convert it adiabatically in a smooth fashion into any shape without much loss in the pump power in the other end.

Because of the flexibility of 3-D direct waveguide writing, it is possible to combine fiber cores and the 3-D waveguide in the same glass slab which turns the glass slab into a 3-D WDM coupler that couples the signal light and the pump.

In an embodiment of the present invention, a 3-D laser written glass substrate can take in signals into 4 cores and it can also take in pump light from the rectangular input and combine the signal cores and the pump light into a shaped geometry at the output.

In an embodiment of the present invention, the waveguides can be arranged so that the refractive index of the pump waveguide is no larger than the glass substrate but smaller than the refractive indices of the signal cores. In an embodiment, the side including the special shaped geometries is the output.

In an embodiment of present invention, a multicore erbium-doped fiber amplifier includes a 3-D direct laser written glass substrate which is used to efficiently couple the multiple cores as well as the pump laser into a pump waveguide.

In an embodiment of the present invention, a multicore erbium-doped fiber amplifier includes a 3-D direct laser written glass substrate which is used to efficiently couple the multiple cores as well as pump the laser into a pump waveguide. The signal propagating in the multicore fiber (MCF) is coupled into the cores in the glass substrate that were designed to match the core in the MCF. At the same time the pump laser is coupled into the rectangular waveguide input in the substrate. In an embodiment of the present invention, a waveguide includes a multimode diode pump.

In an embodiment of the present invention, a waveguide brings a multimode pump laser from the laser diode to the substrate. In other embodiments, the pump laser can also be launched into the laser waveguide inside the substrate by other methods such as direct butt coupling. In another embodiment of the present invention, the multimode pump laser can be efficiently coupled into the pump waveguide in the multicore EDF. In another embodiment, the pump waveguide in the multicore EDF can support multitude of modes and can support all of the power from the multimode pump. In another embodiment, the pump laser is launched into the pump waveguide ring from the ends of the shaped geometries, the pump laser can be confined into the waveguide. In an embodiment, the pump is able to efficiently amplify the signals in the cores with high efficiency and with low noise.

In another embodiment of the present invention, the amplifier design can be altered in many ways, for example, the pump and signal can travel in opposite directions, such as a backward pumped amplifier. In other embodiments, the number of cores may be different. In other embodiments, the cores can be organized in various ways. In another embodiment, the pump can be coupled into the glass substrate in many different ways. In an embodiment, the multicore fiber can be replaced by a number of single core fibers, and the signal from each single core can be launched into a different core in the glass substrate. In another embodiment, a 3-D waveguide can be glass or other material. In another embodiment, the 3-D waveguides can be generated by direct laser writing or other techniques.

In an embodiment, the methods for laser inscription of 3-D waveguides are used for manufacturing optical amplifiers for optical-based communication and submarine cable systems.

In another embodiment, use of 3-D waveguides is the method for achieving WDM coupling of pump and corresponding signal. In an embodiment, the light paths can be controlled individually in three dimensions to guide the pump light into the targeted core without dispersing it into the entire fiber.

In an embodiment of the present invention, the 3-D wave guiding not only guides light into the vicinity of the targeted core, the waveguides can be designed to achieve the coupling process. In another embodiment, 3-D waveguides can be designed for efficient transfer of the pump light into the targeted EDF core.

In an embodiment of the present invention, 3-D waveguides not only control the guiding of pump into the signal core, but they are also the medium where the transfer of pump light occurs into the signal path. In an embodiment, 3-D waveguides can be generated through direct laser inscription, or they can be manufactured through other processes.

In an embodiment, use of multicore amplifiers, for example, erbium-doped fiber amplifiers (EDFAs), can be used. In an embodiment, a plurality of erbium doped fibers (EDFs) each of which contain a single erbium-doped core, are replaced by a single fiber which has a plurality of cores that are doped with erbium. In an embodiment these cores are single-core EDFs and multi-core EDFs. In an embodiment, when utilizing single-core fibers, a method for combining pump and signal into the core of the EDFs for single-core fibers, is provided. In an embodiment, a method to combine pump and signal at individual cores of a multicore EDFs is provided. In an embodiment, for efficient working of an EDFA, the pump and signal can be combined and launched together into the erbium-doped core. In an embodiment, combining pump and signal in the same fiber, for example, optically coupling the pump and signal occur in the same fiber. In an embodiment, pump and signal can be of different wavelengths.

In another embodiment, the 3-D waveguides are deployed within telecommunication networks wherein the optical amplification is provided by the 3-D waveguides.

In an embodiment, 3-D wave guiding can control where the light from each core goes, and then individually combine with the pump and then go back to the multicore again.

In an embodiment, 3-D wave guiding not only guides the light to an intended target, but also contributes to the coupling procedure which can be implemented inside the 3-D waveguide.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A 3-dimensional (3-D) inscribed wavelength division multiplexer (WDM) coupler for optical amplifiers, comprising:
   a substrate including magneto-optic materials;
   a 3-dimensional pump waveguide direct laser inscribed into the substrate;
   an optical pump laser coupled into the 3-dimensional pump waveguide; and
   a multicore fiber coupled into cores in the direct laser inscribed substrate.

2. The 3-D WDM coupler of claim 1, wherein the optical pump laser includes a multimode pump laser diode.

3. The 3-D WDM coupler of claim 1, further comprising at least one optical filter coupled to the 3-dimensional pump waveguide.

4. The 3-D WDM coupler of claim 1, further comprising a refractive index of the cores, wherein the refractive index of the cores is greater than a refractive index of the 3-dimensional pump waveguide, and wherein the refractive index of the 3-dimensional waveguide is greater than a refractive index of the substrate.

5. The 3-D WDM coupler of claim 1, wherein the multicore fiber includes a plurality of single cores.

6. The 3-D WDM coupler of claim 1, wherein the optical pump laser transfers pump light into a signal path in the 3-dimensional waveguide.

7. The 3-D WDM coupler of claim 1, further comprising at least one grating.

8. The 3-D WDM coupler of claim 1, wherein the substrate includes a glass substrate.

9. The 3-D WDM coupler of claim 1, wherein the 3-dimensional pump waveguide includes a multimode diode pump.

10. A method of 3-dimensional (3-D) wavelength division multiplexer (WDM) coupling for optical amplifiers, comprising:
    splitting an optical pump laser light into multiple light paths;
    aligning the multiple light paths with a 3-dimensional pump waveguide adjacent to a signal waveguide;
    coupling the multiple light paths with multiple signals in the signal waveguide, forming combined pumped signals;
    delivering the combined pumped signals into a multicore fiber; and
    integrating the splitting, aligning, coupling and delivering to occur within a direct laser inscribed substrate, the inscribed substrate including magneto-optic materials.

11. The method of claim 10, wherein the coupling includes utilizing a multimode pump laser diode.

12. The method of claim 10 further comprising:
    controlling the multiple light paths individually in three dimensions; and
    guiding the multiple light paths into the signal waveguide without dispersing the optical pump laser light outside the signal waveguide.

13. The method of claim 10 further comprising launching light from both the multiple light paths and the multiple signals together.

14. The method of claim 10 further comprising filtering the multiple signals.

15. The method of claim 10 further comprising filtering the multiple signals with at least one grating.

16. The method of claim 10, wherein the coupling of the multiple light paths with the multiple signals occurs in a glass substrate.

17. The method of claim 10, wherein the coupling of the multiple light paths with the multiple signals occurs in a multicore fiber.

18. The method of claim 10, wherein the coupling of the multiple light paths with the multiple signals occurs in single core erbium-doped fibers.

19. The method of claim 10, wherein the coupling of the multiple light paths with the multiple signals occurs in multicore erbium-doped fibers.

* * * * *